Oct. 28, 1952  P. J. GUILLOT ET AL  2,616,019
ELECTRIC HEATER CONTROL
Filed June 17, 1949

INVENTORS
HARRY R. KARP
PHILIP J. GUILLOT
BY
ATTORNEY

Patented Oct. 28, 1952

2,616,019

UNITED STATES PATENT OFFICE 2,616,019

ELECTRIC HEATER CONTROL

Philip J. Guillot, Upper Montclair, and Harry R. Karp, Newark, N. J., assignors to Bendix Aviation Corporation, Teterboro, N. J., a corporation of Delaware Application June 17, 1949, Serial No. 99,765

4 Claims. (Cl. 219—20)

The present application relates to multiple speed gearing and particularly to a novel clutch and gear arrangement for an electric heater control.

An object of the invention is to provide a novel two-speed clutch and gear arrangement for controlling the rate of change in energization of an electric heater for a transparent panel.

Another object is to provide a two-speed solenoid controlled gear train for operating a movable control element so as to vary the rate of change in energization of an electric heater embedded in a transparent panel in response to the temperature appurtenant to the panel.

Another object is to provide a simple, compact two-speed gear train for controlling the rate of application of heat to a transparent panel or windshield.

Another object of the invention is to provide a novel two-speed control for the application of heat to a windshield.

The above and other objects and features of the invention will appear more fully hereinafter from a consideration of the following description taken in connection with the accompanying drawings wherein one embodiment of the invention is illustrated by way of example.

Figure 1:
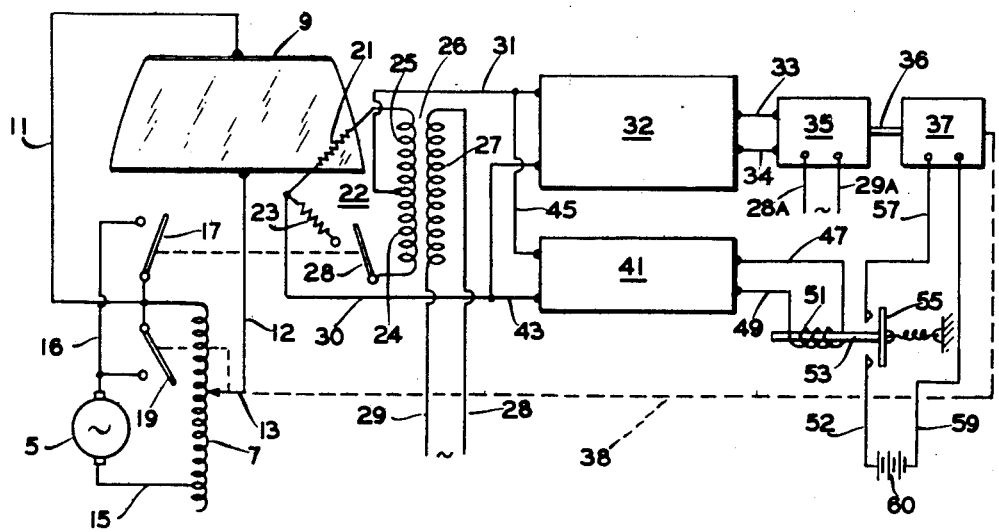
Figure 1 is a schematic diagram of a control system for a windshield heater.

Referring to the drawing of Figure 1, there is illustrated a control system for a windshield heater certain features of which control system have been claimed broadly in application Serial No. 68,594, filed December 31, 1948, by Joel D. Peterson and other features of which control system have been more specifically disclosed and claimed in application Serial No. 99,764, filed June 17, 1949, by Harry R. Karp and Allen W. Blanchard. The control system includes an alternator 5 of a suitable type adapted to be driven by an aircraft engine as a source of power, and a variable transformer 7 which is arranged to modify the output voltage applied by the alternator 5 to a windshield heater 9.

The heater 9 of the windshield may be a transparent electrical conductive coating applied to the windshield of a type such as sold under the trade-names Nesa and Electra-Pane. The heater 9 is connected by conductors 11 and 12 to the output of the transformer 7. The conductor 12 is connected to a movable arm 13 of the transformer 7. The transformer 7 is connected by conductors 15 and 16 to the output of the alternator 5. The conductor 16 is controlled by on-off switch 17 and limit switch 19 connected in parallel.

A temperature sensing element 21 is embedded in the windshield and comprises a resistance having a high temperature coefficient, such as tungsten, and is used as a master to determine the amount and rate of application of heat to the windshield. The temperature element 21 may be of such a type as shown and claimed in copending application Serial No. 151,009, filed March 21, 1950, as a division of the application Serial No. 68,594, filed December 31, 1948, by Joel D. Peterson.

The temperature element 21 forms one arm of an alternating current excited bridge 22. A non-thermal sensitive reference resistor 23 serves as another leg of the bridge, and the remaining legs are provided by the windings 24 and 25 forming the secondary of the transformer 26. The bridge circuit is supplied with alternating current by the primary winding 27 inductively coupled to the secondary windings 24 and 25. The winding 27 is connected to a suitable source of alternating current. The resistor 23 is of a value such as to balance the bridge when the control temperature, say for example, 120° F. is reached. The output of the bridge will be directional or phased, depending upon whether the resistance of the element 21 is above or below the reference resistor 23 which is connected into the bridge by an on-off switch 28 mechanically connected to switch 17. The output voltage of the bridge 22 is connected by conductors 30 and 31 to the input of a phase-sensitive detector and amplifier 32.

The output of the amplifier 32 is connected by conductors 33 and 34 to one phase winding of a reversible motor 35, which may be of the two-phase type, the other phase winding being connected by conductors 28A and 29A across the source of alternating current for operation of the motor 35 in a manner well known in the art. The output shaft 36 of the motor 35 is mechanically connected to deliver torque to a gear train 37. The gear train 37 is of a two-speed type having a ratio changing system and solenoid control clutch for selecting output speeds of rotation of N or N/10, the operation of which will be explained.

The output of the gear train 37 is mechanically connected by a shaft 38 to rotate the movable arm 13 of the variable transformer 7 to provide an output voltage dependent upon the position of the movable arm. The input voltage of the transformer 7 will be the output voltage of the alternator 5. Thus, when the value of resistor 21 is below that of the resistor 23, the bridge 22 will be unbalanced in a direction to energize the reversible motor 35 so as to drive the movable arm 13 of the transformer 7 in a direction to increase the voltage applied to the windshield 9. When the value of the resistor 21 is above that of the resistor 23, the bridge 22 will be unbalanced in the opposite direction to energize the motor 35 so as to drive the movable arm 13 of the transformer 7 in a direction to decrease the voltage applied to the windshield 9. Upon the values of the resistors 21 and 23 being equal the bridge will be balanced, hence the motor 35 will not be energized and as long as the temperature of the windshield remains constant, the voltage supplied thereto will be constant. As the temperature changes the control system will continuously adjust itself to maintain a constant preselected temperature at the windshield 9 regardless of changes in outside air temperature or heat transfer conditions.

In order to avoid thermal shock or other damage caused by a too rapid change in temperature, it is necessary to limit the rate of change to a safe value when the temperature of the windshield 9 is below a predetermined value, say for example 100° F. However, when the temperature of the windshield 9 reaches the predetermined temperature a fast reaction to temperature changes due to changes in outside air temperature, aircraft speed, and heat transfer conditions is desirable. Such a method of applying heat to a transparent panel so as to effect the foregoing is disclosed and claimed in a copending application Serial No. 274,484, filed March 1, 1952, by Harry R. Karp and Allen W. Blanchard and assigned to Bendix Aviation Corporation.

By means of the two-speed gear train 37, two operating speeds are automatically obtained. The gear train is mechanically connected to be operated through a solenoid-controlled clutch as will be explained hereinafter with reference to Figures 2 and 3. Control for the solenoid is provided by an auxiliary circuit 41 connected by conductors 43 and 45 across the output of the bridge 22. The auxiliary circuit 41 may, for example, be an amplifier circuit so arranged as to have energy flowing in its output circuit when the temperature of the windshield 9 is below a predetermined value of, for example 100° F. A pilot relay winding 51 is connected by conductors 47 and 49 across the output of the circuit 41. The relay winding 51 controls an armature element 53 arranged to close switch contacts 55 upon the winding 51 being energized. Closing the switch contacts 55 energizes the solenoid of the two-speed clutch 37 through conductors 57 and 59 from a D. C. source of electrical energy 60.

Upon energization, the solenoid actuates the clutch and thereby the gear train 37 to its N gear ratio where it will be maintained as long as the control solenoid is energized. When the gear train 37 is in this position, the movable arm 13 of the transformer 7 will be rotated slowly giving a slow rate of temperature rise.

Upon the temperature of the windshield 9 reaching 100° F., the auxiliary circuit 41 causes relay winding 51 to release the armature 53 under spring tension and return the switch contacts 55 to an open position de-energizing the control solenoid of the gear train 37 and return the gear train 37 to its normal N/10 ratio. In this latter position the movable arm 13 will be rotated at a faster rate thus providing fast action to give good response in the region of the control temperature.

Figure 2:
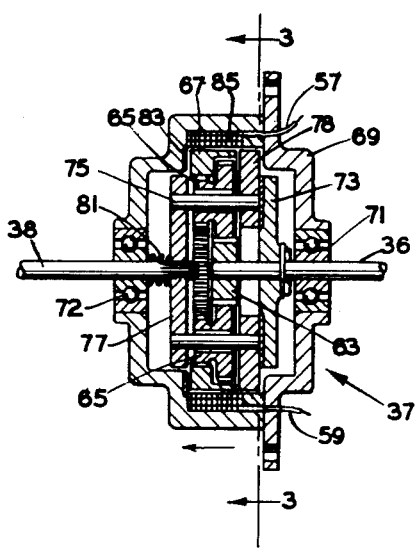
Figure 2 is a cross-sectional view of a solenoid operated clutch.
Figure 3:
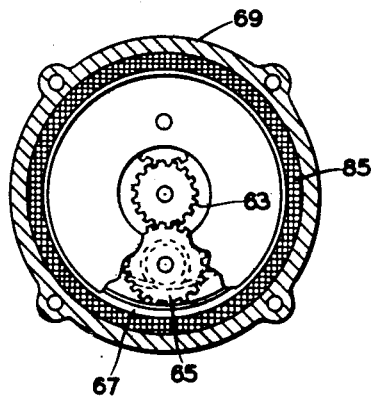
Figure 3 is a sectional view of the clutch of Figure 2 taken in the line 3—3 thereof.

The invention forming the subject matter of the present application is the solenoid controlled clutch gear train assembly 37 illustrated by Figures 2 and 3 and its arrangement and use in the control system heretofore described. In the solenoid controlled gear train assembly 37 there is secured to the input shaft 36 a sun gear 63 which meshes with planet gears 65, which in turn mesh with orbit gear 67. The input shaft 36 is rotatably supported in housing 69 by bearing 71.

Securely attached to the shaft 36 is a brake plate 73. The planet gears 65 are supported on shafts 75 carried by spiders 77 and 78. The spider 77 is splined to output shaft 38 which is rotatably supported in the housing 69 by a bearing 72. A compression spring 81 bears against the spider 77. Adjacent to the orbit gear 67 on the housing 69 is a clutch facing 83. A solenoid winding 85 is arranged around the inner circumference of the housing 69. The winding 85 is connected through switch 55 to the source of direct current 60 by two conductors 57 and 59. The orbit gear 67 and spider 78 serve as the armature of the solenoid.

In operation, when the solenoid winding 85 is de-energized as shown in Figure 2, the spider 78 is held in intimate contact with the brake plate 73 by the pressure of the spring 81. This locks the planetary system and permits it to rotate with an effect a direct mechanical connection between the input shaft 36 and output shaft 38 as shown in Figure 2. When the solenoid winding 85 is energized, the pressure of the spring 81 is overcome and the spider 78 is moved out of contact with brake plate 73. Also the orbit gear 67 is biased by the solenoid 85 into intimate contact with the brake facing 83 whereupon the shaft 38 is driven through the planetary gear system.

When the pilot determines that heat will be needed at the windshield 9, he may manually actuate the switch 17 to the "on" position and close the switch 28 in the bridge circuit 22 so as to place the bridge circuit 22 in an operative condition sensitive to temperature changes. The unbalance in the bridge circuit 22 causes the solenoid 85 to actuate the gear train 37 to the N ratio. The movable arm 13 of the variable transformer operated by the shaft 38 begins to rotate slowly increasing the voltage applied to the windshield 9. As the movable arm 13 moves away from its low voltage position, the limit switch 19 operated by the arm 13 automatically returns to its normally closed position.

When the temperature of the windshield 9 reaches 100° F. the auxiliary circuit 41 opens the switch 55 and the solenoid 85 becomes de-energized. Spring means 81 actuate the gear train 37 to its N/10 ratio so that the arm 13 driven by shaft 38 rotates faster until the temperature is 120° F. As the temperature varies from 120° F., an unbalanced voltage appears at the output of the bridge 22 of such a phase as to cause the motor 35 to drive the arm 13 in such a direction as to increase (or decrease) the energy supplied and thus maintain 120° F. at the windshield 9.

To shut off the system, the switch 17 is actuated to its "off" position. This also opens the interconnected switch 28 in the bridge circuit 22 introducing a large unbalanced voltage in the system of such a phase as to cause motor 35 to drive the arm 13 to a low voltage position. This unbalanced voltage also causes the auxiliary circuit 41 to energize the solenoid 51 and close the switch 55 to energize solenoid 85 which actuates the gear train 37 to its N ratio thereby rotating the arm 13 at a slow rate, thus limiting the rate of decrease of temperature.

Upon the arm 13 reaching its minimum voltage position, it will automatically operate the limit switch 19 to cut off all power to the system. The system will then be in the proper position when it is recycled.

The automatic temperature control system limits the rate of change of temperature to a safe value and also continuously adjusts itself to maintain a constant preselected temperature at the windshield regardless of changes in outside air temperature or heat transfer conditions. The only manual control required is the "on-off" switch 17—28 while the novel two-speed control 37 provides automatic means dependent upon conditions affecting the system for varying the rate of temperature change.

Although only one embodiment of the invention has been illustrated and described, various changes in the form anad relative arrangements of the parts may be made to suit requirements.

What is claimed is:

1. For use in a control system for regulating the temperature of a transparent panel having a heater element embodied therein, a temperature sensitive element responsive to the temperature appurtenant to said panel, motor means responsive to said temperature sensitive element, and a movable member for varying the voltage supplied said heater element; a power transmitter comprising an input shaft for connection to said motor means, an output shaft for connection to said movable member, a gear train for interconnecting said shafts, electromagnetic means selectively operable to lock said gear train so as to directly connect in driving relation the input shaft to the output shaft at one speed ratio and to release said locked gear train so as to cause said output shaft to be driven from said input shaft through said gear train at another and lower speed ratio, means for electrically connecting said electromagnetic means to said temperature sensitive element to cause said gear train to effect said different speed ratios in response to the prevailing temperature appurtenant to the panel.

2. For use in a control system for regulating the temperature of a transparent panel having a heater element embodied therein, a temperature sensitive element responsive to the temperature appurtenant to said panel, motor means responsive to said temperature sensitive element, and a movable member for varying the voltage supplied said heater element; a power transmitter comprising an input shaft for connection to said motor means, an output shaft for connection to said movable member, a gear train for interconnecting said shafts, electromagnetic means selectively operable to lock said gear train so as to directly connect in driving relation the input shaft to the output shaft at one speed ratio and to release said locked gear train so as to cause said output shaft to be driven from said input shaft through said gear train at another and lower speed ratio, means for electrically connecting said electromagnetic means to said temperature sensitive element to cause said gear train to effect said different speed ratios in response to the prevailing temperature appurtenant to the panel, said gear train including a planetary gear train connecting the input and output shafts, spring means for biasing said gear train in one position to lock said gear train, and said planetary gear train biased by said electromagnetic means to a second position against the bias of said spring means so as to cause said gear train to be operative at predetermined temperature conditions appurtenant to the panel.

3. For use in a control system for regulating the temperature of a transparent panel having a heater element embodied therein, a temperature sensitive element responsive to the temperature appurtenant to said panel, motor means responsive to said temperature sensitive element, and a movable member for varying the voltage supplied said heater element; a power transmitter comprising an input shaft for connection to said motor means, an output shaft for connection to said movable member, a gear train for interconnecting said shafts, electromagnetic means selectively operable to lock said gear train so as to directly connect in driving relation the input shaft to the output shaft at one speed ratio and to release said locked gear train so as to permit said output shaft to be driven from said input shaft through said gear train at another and lower speed ratio, means for electrically connecting said electromagnetic means to said temperature sensitive element to cause said gear train to effect said different speed ratios in response to the prevailing temperature appurtenant to the panel, said gear train including a planetary gear train having a sun gear, a plurality of planet gears, and an orbit gear, first means for locking the planetary gear train for effecting a direct mechanical connection between said input and output shafts, and second means operated by the electromagnetic means for overcoming said first means and to lock said orbit gear to effect power transmission from said input shaft to said output shaft through said planetary gear train at a lower speed ratio upon the temperature appurtenant to the panel being below a predetermined value.

4. For use in a control system for regulating the temperature of a windshield having a heater element embodied therein, the combination of a two-speed power transmitting device having an input shaft, an output shaft, a planetary gear train interconnecting said shafts, said gear train having a sun gear, a plurality of planet gears, a planet gear cage and an orbit gear, a releasable clutch for drivingly connecting said input and output shafts, means for normally biasing said planet gear cage into engaging relation with said clutch for rotation of said output shaft directly with said input shaft, a solenoid winding circumferential of said orbit gear, engageable brake means for said orbit gear controlled by the solenoid winding, means for supplying electrical energy to said windshield including a movable arm for varying the voltage thereof, said movable arm operatively connected for actuation by the output shaft, a temperature sensitive element responsive to the temperature appurtenant to said windshield, motor means responsive to said temperature sensitive element for driving said input shaft in a direction so as to maintain the temperature of said windshield at a predetermined temperature, and means including said temperature element for energizing said solenoid winding upon a predetermined temperature condition to overcome said biasing means to cause said clutch to release said planet gear cage and said brake means to engage said orbit gear so as to cause said output shaft to be rotated through said gear train by the input shaft at a relatively slow rate and thereby to control the rate of temperature change.

PHILIP J. GUILLOT.
    HARRY R. KARP.

REFERENCES CITED

The following references are of record in the file of this patent:

UNITED STATES PATENTS

| Number | Name | Date |
|---|---|---|
| 1,675,392 | Tompkins | July 3, 1928 |
| 1,694,264 | Hull | Dec. 4, 1928 |
| 1,715,750 | Gano | June 4, 1929 |
| 1,942,587 | Whitman | Jan. 9, 1934 |
| 2,079,497 | Wilhjelm | May 4, 1937 |
| 2,462,207 | Mershon | Feb. 22, 1949 |
| 2,470,633 | Mershon | May 17, 1949 |

FOREIGN PATENTS

| Number | Country | Date |
|---|---|---|
| 399,582 | Germany | July 23, 1924 |
| 544,407 | France | June 21, 1922 |
| 590,050 | France | Mar. 8, 1925 |
| 819,170 | France | July 5, 1937 |